(12) United States Patent
Kutlucinar et al.

(10) Patent No.: US 6,229,438 B1
(45) Date of Patent: *May 8, 2001

(54) VEHICULAR HAZARD WARNING SYSTEM

(75) Inventors: Iskender V. Kutlucinar, Kensington; Andrew M. Saul, II, Chevy Chase, both of MD (US)

(73) Assignee: Emergency Warning Systems, Inc., Kensington, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/551,950

(22) Filed: Apr. 19, 2000

Related U.S. Application Data (63) Continuation of application No. 09/093,189, filed on Jun. 8, 1998, now Pat. No. 6,081,188.

(51) Int. Cl.$^7$ ........................................................ B60Q 1/00
(52) U.S. Cl. ........................... 340/438; 340/471; 340/472
(58) Field of Search .................................. 340/438, 463, 340/468, 471, 472, 479, 903, 447

(56) References Cited

U.S. PATENT DOCUMENTS

| | | |
|---|---|---|
| 3,629,815 | 12/1971 | Hattwig et al. . |
| 4,086,562 | 4/1978 | Hasegawa . |
| 4,127,844 | 11/1978 | Purdy . |
| 4,274,091 | 6/1981 | Decker . |
| 4,492,952 | 1/1985 | Miller . |
| 4,577,502 | 3/1986 | Scaduto et al. . |
| 4,626,850 | 12/1986 | Chey . |
| 4,651,290 | 3/1987 | Masaki et al. . |
| 4,843,370 | 6/1989 | Milde, Jr. . |
| 4,847,589 | 7/1989 | Dobbins . |
| 4,876,525 | 10/1989 | Gross . |
| 4,878,042 | 10/1989 | Eggiman et al. . |
| 4,990,886 | 2/1991 | Stanulis . |
| 5,139,115 | 8/1992 | Browne et al. . |
| 5,311,197 | 5/1994 | Sorden et al. . |
| 5,416,476 | 5/1995 | Rendon . |
| 5,481,243 | 1/1996 | Lurie et al. . |
| 5,602,542 | 2/1997 | Widmann . |
| 5,610,578 | 3/1997 | Gilmore . |
| 5,635,922 | 6/1997 | Cho et al. . |
| 5,638,045 | 6/1997 | Byrd . |
| 5,760,708 | 6/1998 | Seith . |
| 5,828,319 | 10/1998 | Tonklin et al. . |
| 6,081,188 * | 6/2000 | Kutlucinar et al. ................... 340/438 |

* cited by examiner

Primary Examiner—Edward Lefkowitz
(74) Attorney, Agent, or Firm—Kenyon & Kenyon (57) ABSTRACT

An apparatus and method warn drivers of a hazardous condition experienced by another driver. The apparatus generally includes a warning indicator, such as for example a strobe light, coupled to a vehicle warning controller. The vehicle warning controller is connected between a power source and a plurality of vehicle detecting circuits which detect the activation of a safety device. Vehicle detecting circuits can include an antilock braking system (ABS) detecting circuit, an airbag deployment detecting circuit, a rollover protection detecting circuit and an obstacle detector detecting circuit. When at least one of the vehicle's detecting circuits detects the activation of a safety device due to a hazardous condition, a signal is sent to the vehicle warning controller. The warning indicator is activated in response to a signal from the vehicle's warning controller. Therefore, driver intervention is alleviated in warning other motorists of potential danger.

18 Claims, 5 Drawing Sheets

VEHICULAR HAZARD WARNING SYSTEM

This is a continuation of U.S. patent application Ser. No. 09/093,189, filed Jun. 8, 1998, now U.S. Pat. No. 6,081,188.

FIELD OF THE INVENTION

The present invention relates to the field of motor vehicles. More particularly, the present invention is directed to a system that provides a warning to others of the possibility of a hazard experienced by a driver of a vehicle in which the warning system is installed.

BACKGROUND

Prior art vehicular warning light systems commonly include a taillight assembly, headlight assembly, brake light assembly, turn signal assembly, and an emergency flasher assembly, all employing incandescent light bulbs. Each of these assemblies operates in a well-known manner to illuminate the roadway, to indicate an impending stop or slowdown, indicate an impending turn, or indicate an emergency condition of some nature.

Conventional vehicular warning lighting systems suffer from certain drawbacks under modern driving conditions. For example, emergency flashers, which are standard equipment on motor vehicles, require that a vehicle occupant operate the flashers by pressing a switch that is usually located on or near a vehicle's steering column. Typically, these flashers are employed by the driver when the driver is in a distressful situation or to warn others including other drivers, of the vehicle's presence. Therefore, if the driver or other occupant cannot activate the flashers, other drivers will not become aware of a driver's peril or the vehicle's presence.

Another conventional vehicular warning lighting system is the use of brake lights. The driver must apply the brakes in order to activate this warning device to alert others of a potential hazard. Even if the driver does activate the system, occasions can arise where there is still insufficient warning to others. For example, in the situation where a leading vehicle applies a conventional brake light system used to indicate that the vehicle is slowing down or stopping, a following vehicle may not have sufficient time to stop because the following vehicle may be located too close to the leading vehicle such that the brake lights of the leading vehicle cannot be seen in sufficient time to allow the following vehicle to stop. Additionally, on very sunny days, the intensity of the brake lights is such that a driver may not be able to determine whether the brakes have been applied in the leading vehicle.

Other forms of vehicular warning systems include horns, flares or a white flag or towel displayed on the vehicle to indicate that the driver is in distress. In each of these cases, however, these warning systems require driver intervention.

Therefore, it can be appreciated that there exists a need for a vehicular warning system which indicates to others that a vehicle or its occupants are experiencing a hazardous condition or are in a dangerous position, but which does not require any intervention from the driver of that vehicle.

SUMMARY OF THE INVENTION

In view of the foregoing disadvantages inherent in known types of prior art vehicular warning systems, the present invention provides a vehicular warning system, which detects when the automobile in which it is employed has engaged a safety mechanism or is in a hazardous condition and provides an appropriate warning to others about the condition.

To attain this, the vehicular warning system of the present invention generally comprises at least one warning indicator which is detectable outside of the car in which the system is installed, such as a light or an audible indictor which is operationally coupled to a warning controller. Examples of a light indicator include a strobe light, or other high intensity light. The audible indicator could be a horn. The warning controller, which is preferably a microprocessor, is operationally coupled to a power source and a detecting circuit(s) which detects the activation of a vehicle safety device or detects a hazardous condition with regard to the vehicle in which the warning system is installed. Examples of hazardous conditions include the vehicle reaching its maximum braking capacity and the wheels locking up, the vehicle experiencing frontal or side impact, the vehicle positioned too close to an obstacle such as another vehicle, a pedestrian, etc., the vehicle tilting over and other similar situations. Examples of detecting circuits include an antilock braking system (ABS) detecting circuit, an airbag deployment detecting circuit, a rollover protection detecting circuit and a parking aid detecting circuit. Upon activation of at least one of the abovementioned vehicle safety devices, a signal from an associated detecting circuit(s) is provided to the vehicle warning controller. The vehicular warning system is activated in response to a signal or signals from the vehicle warning controller. Upon detection of the signal, the warning indicator is automatically engaged so that there is no need for driver intervention.

It is to be understood that the invention is not limited in its application to the details of construction and arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The term "vehicle" as used herein includes, but is not limited to, all types of motorized transportation including automobiles, trucks, vans, motorcycles and the like. The term "automatically" is used herein to mean that the system is activated without human intervention.

As such, those skilled in the art will appreciate that the invention, upon which this disclosure is based, may readily be utilized as a basis to design other structures, methods and systems for carrying out the purpose of the present invention. It is important, therefore, that the claims are regarded as including such equivalent construction insofar as they do not depart from the spirit and scope of the present invention.

BRIEF DESCRIPTION OF THE DRAWINGS

The invention will be better understood when consideration is given to the following detailed description thereof. Such description makes reference to the annexed drawings wherein similar reference characters refer to similar parts throughout the several views of the drawings.

DETAILED DESCRIPTION

Figure 1:
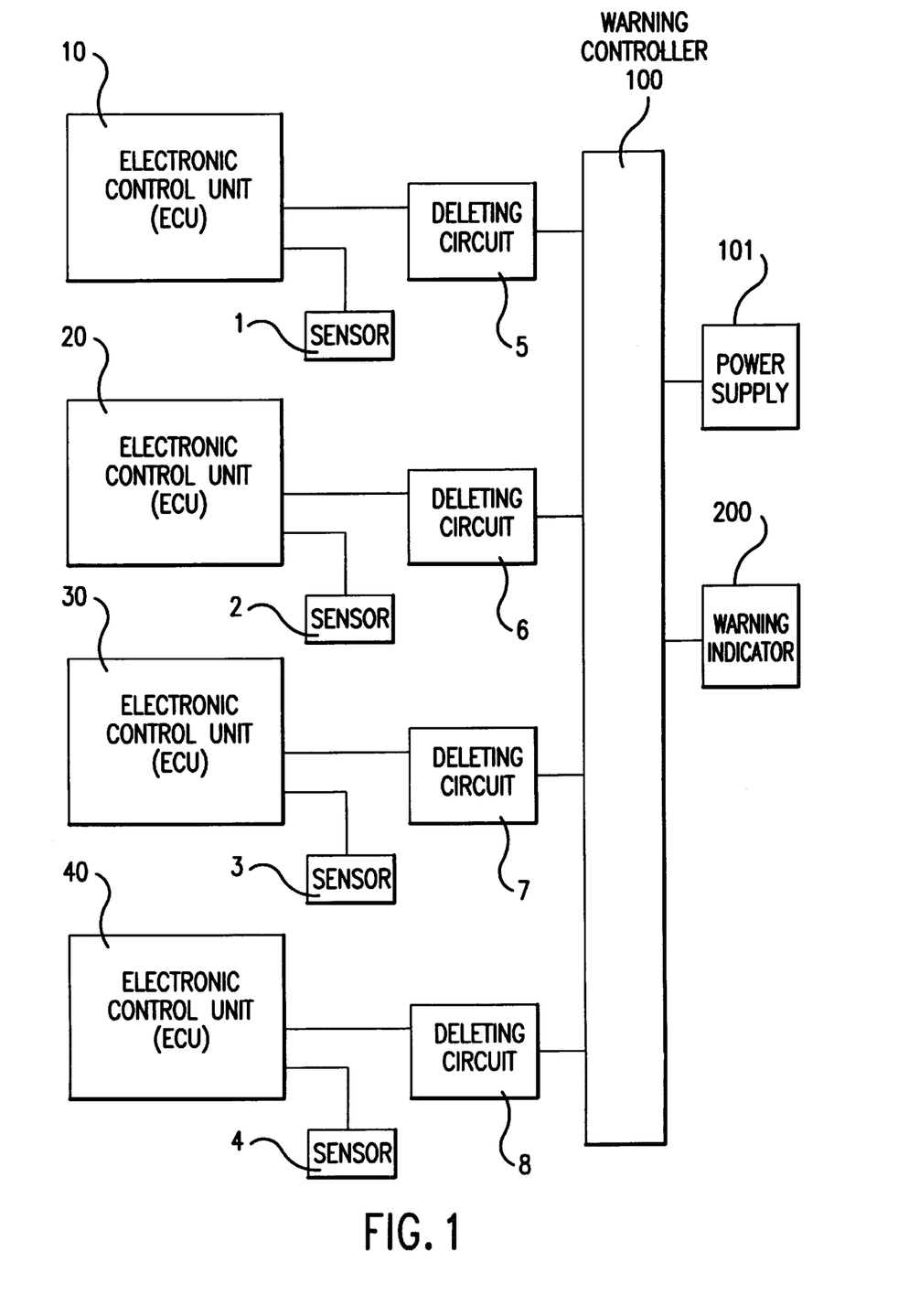
FIG. 1 is a block diagram depicting the functional interrelationships of the components of the vehicular warning system of the present invention.

The present invention is a vehicle warning system for alerting drivers that the vehicle containing the vehicle warning system is experiencing dangerous or potentially dangerous conditions or is in a hazardous position. The vehicle warning system of this invention preferably includes at least one detecting circuit to detect activation of at least one safety device within the vehicle or to detect a hazardous road condition. In the alternative and as shown if FIG. 1 a plurality of detecting circuits may be used, each connected to an electronic control unit (ECU) of a vehicular safety device. According to one aspect of the present invention, each of the detecting circuits may be used independently of one another. The detecting circuits which may be employed with the present invention include an (ABS) activation detecting circuit, an airbag deployment detecting circuit, a rollover protection system activation detecting circuit and an obstacle detection detecting circuit, although it will be appreciated that the vehicular warning system of the present invention may be used in conjunction with any vehicle safety device concurrently installed in the vehicle. Referring to FIG. 1, each of the detecting circuits (5–8) is connected between an ECU for each of the safety devices and a vehicle warning controller 100. In particular, detecting circuit 5 is connected between airbag system ECU 10 and warning controller 100. Detecting circuit 6 is connected between rollover protection system ECU 20 and warning controller 100. Detecting circuit 7 is connected between obstacle detection system ECU 30 and warning controller 100. Detecting circuit 8 is connected between ABS system 40 and warning controller 100. Each of the above-mentioned detecting circuits receives a signal from its respective ECU, indicating the activation of the corresponding safety device. Various signaling methods can be employed to communicate to the detecting circuits that a safety device has been triggered. Such a signaling method may include the generation of an electrical or optical pulse by the ECU such that the detecting circuit is notified when a safety device has been activated. While the respective detecting circuits have been illustrated as discrete elements, they could, alternatively, be provided in an integrated design.

The output of each of the detecting circuits is provided to a vehicle warning controller 100 which in turn is functionally connected to a power supply 101 and a warning indicator 200. Alternatively, a plurality of warning controllers 100 may be employed. Warning indicator 200 may include, for example, a light such as a high-intensity light or a horn, or a combination of such devices. Electrical power is provided by a conventional storage battery, solar battery or other power source 101 supplemented as necessary by a conventional electrical generating system (not shown). Each of the detecting circuits continuously monitors its respective ECU and emits an alarm signal to the warning controller 100 when its respective ECU indicates that a safety device has been activated. Warning controller 100 then activates warning indicator 200 which transmits a warning signal that a hazardous condition has been detected. The warning signal can remain activated until a predetermined time has expired. Alternatively, the warning signal can be terminated automatically or manually by the vehicle occupant.

According to FIG. 1 and the principles of the present invention, hazardous conditions are detected (acknowledged) by sensors (1–4). Sensors (1–4) may include, but are not limited to, short-circuiting ring sensors, ultrasonic sensors, solenoid plunger sensors, optical sensors, etc. Sensors (1–4) represent a peripheral communications link between a vehicle and the ECU used for processing. Sensors (1–4) convert physical quantities such as the external force applied to the body of a vehicle into an electrical quantity adapted to communicate with a processing device such as an ECU. Examples of such sensors include, but are not limited to, fiber-optic sensors, inductive sensors, gradient sensors, tangential senors, radar sensors, piezoelectric sensors, and the like.

The entire device as shown in FIG. 1 may be mounted within a small cabinet and secured beneath the dashboard of an existing vehicle. Alternatively, the present invention may be incorporated as original equipment in an automobile or other types of vehicle and may be mounted in any convenient location therein.

The following is a description of the various implementations of the vehicular warning system used with the systems of the present invention.

System For Detecting Airbag System Deployment

An airbag system is a vehicular occupant protective system designed to protect a vehicular occupant in case of a vehicle collision. An airbag system generally includes a sensor for detecting a vehicle collision, an inflator for releasing gas into an airbag when a signal is received from the sensor and an airbag that inflates with gas released from the inflator. When a vehicle experiences a collision, the airbag inflates between the vehicular occupant and interior components of the vehicle, such as a dashboard or a steering wheel located in front of the vehicular occupant.

Figure 2:
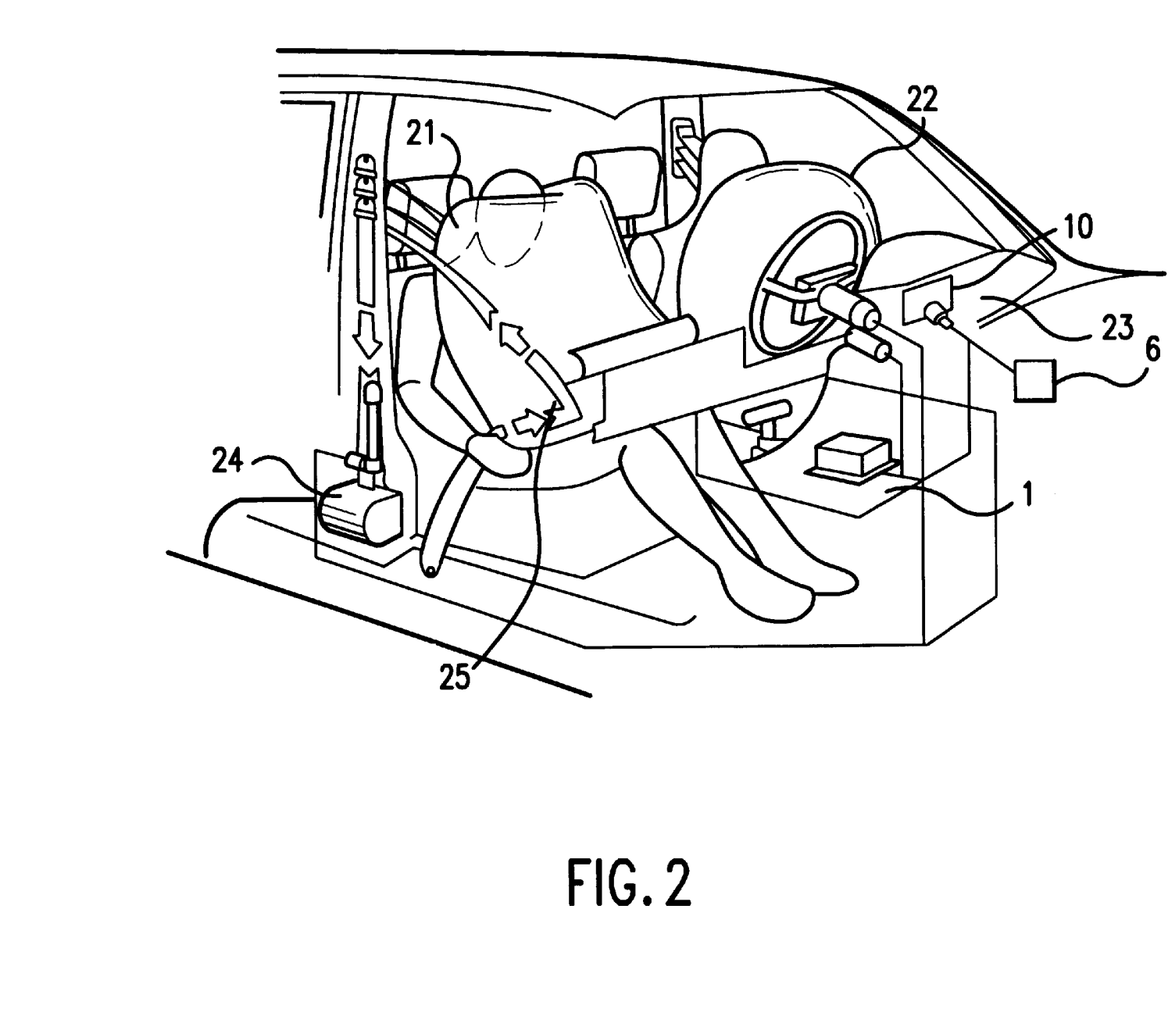
FIG. 2 is a block diagram depicting the functional interrelationships of the components of an airbag system and the vehicular warning system of the present invention.

FIG. 2 illustrates an airbag system which may be used with a warning controller 100 in accordance with an embodiment of the present invention to alert other drivers that an airbag has deployed in the car carrying the warning system. It will be understood that the airbag system as well as the following safety systems are only exemplary, and many other safety systems are available to those skilled in the art to accomplish substantially the same results. As shown in FIG. 2, a front-passenger airbag 21 and a driver airbag 22 are deployed from the dashboard area 23 of a vehicle. Also included is seatbelt tightener 24, which is used to restrain the occupant when the airbags deploy and sensor 1, which is used to detect that the vehicle is in a hazardous situation. Once sensor 1 detects an external pressure exerted on the vehicle, a signal is sent from sensor 1 to ECU 10. ECU evaluates the information supplied by sensor 1 and determines whether to deploy airbags 21 and 22. If ECU 10 determines that the airbags require deployment, ECU 10 generates a signal to activate the airbags. From the signal sent to activate the airbags, detecting circuit 5 determines, (via an electrical pulse or the absence of an electrical pulse, for example), that the airbag(s) has been deployed and communicates this information to warning controller 100.

Upon vehicle collision, a pyrotechnic gas generator inflates (not shown) airbags 21 and 22 in a sudden, explosive process designed to ensure complete inflation prior to occupant contact. The airbags then respond to occupant contact with partial deflation in a response pattern calculated to combine "gentle" force absorption with physiologically acceptable surface pressure and decelerative forces for the occupant. This prevents, or at least greatly reduces, the probability of severity of head and chest injuries to the passenger and/or driver.

Separate airbags for the driver and front seat passenger protect against head and front injuries stemming from impact about less than 60 km/h against a solid obstacle. Airbags 21 and 22 also protect occupants who are not wearing seatbelts, and are therefore of particular benefit in areas or regions where seatbelt use is not mandatory.

The gas generator inflates the full-sized driver airbags 22 with nitrogen ($N_2$) (volume approximately 50 to 60 liters) in 30 to 35 ms, while roughly 50 ms are required to fill the full-sized frontal passenger airbag 21 where the volume is approximately 100 to 140 liters installed in the glove compartment area.

The seatbelt tightener 24 compensates for belt slack and the film-reel effect by retracting (tightening the belts) to further enhance the protection afforded by automatic seatbelts. Seatbelt tightener 24 also includes buckle tightener 25. Buckle tightener 25 pulls the seatbelt buckle rearward to simultaneously tighten the shoulder and lap belts. Buckle tightener 25 combines improved restraint with enhanced protection against "submarining" (in which occupants slide forward beneath the lap belts). A prerequisite for optimum protection is that the occupants' forward movement away from their seats remain minimal as they decelerate along with the vehicle. This is achieved by triggering seatbelt tightener 24 immediately upon initial impact to ensure that effective restraint starts as soon as possible. The maximum forward displacement with tightened seatbelts is approximately 1 cm and the duration of mechanical tensioning process is approximately 5 ms to a maximum of 12 ms. Although seatbelt tightner 24 is used to further enhance the safety of the occupants, the system for detecting airbag deployment can be activated without the use of seatbelt tightner 24.

Of decisive importance to the safety of passengers is to trigger the process of releasing/inflating airbags at precisely the right instant. The occupants contact the airbag at the instant in which it is fully inflated and just starting to deflate. Maximum forward displacement on the driver's side is usually defined at 12.5 cm (the "5 inches rules") with airbag deflation times of approximately 100 ms. The entire impact and energy absorption process is therefore completed within approximately 150 ms. Moreover, as soon as this process has been triggered, information about the airbag's deployment is communicated to warning controller 100. Warning controller 100 then sends a signal to warning indicator 200 which activates a light or horn or other warning signal or device to alert other drivers of a hazardous condition. Generally, the warning signal can be adjusted to be detected at a distance of up to 1 mile and can be adjusted to be detected from the air or the road. Moreover, the warning system can be adjusted to distinguish between conventional vehicle audible or lighting systems. For example, strobe lights or other high-intensity lights can be used.

System For Detecting Rollover Protection System Deployment

A rollover protection system is a vehicular occupant protective system designed to protect a vehicular occupant in the event that the vehicle overturns. Many modern day sports cars and convertibles, particularly of the two-seat configuration, have a rollover bar that extends across the passenger compartment just behind the seat structure for safety reasons. In vehicles with demand-deployment rollover bars and rear head restraints an electronic triggering unit (rollover sensor) provides substantially instantaneous protection in response to incipient vehicle roll by triggering a powerful solenoid to release a pre-tensioned activation spring. Therefore, rollover bars protect occupants from severe injury when the vehicle overturns.

Figure 3:
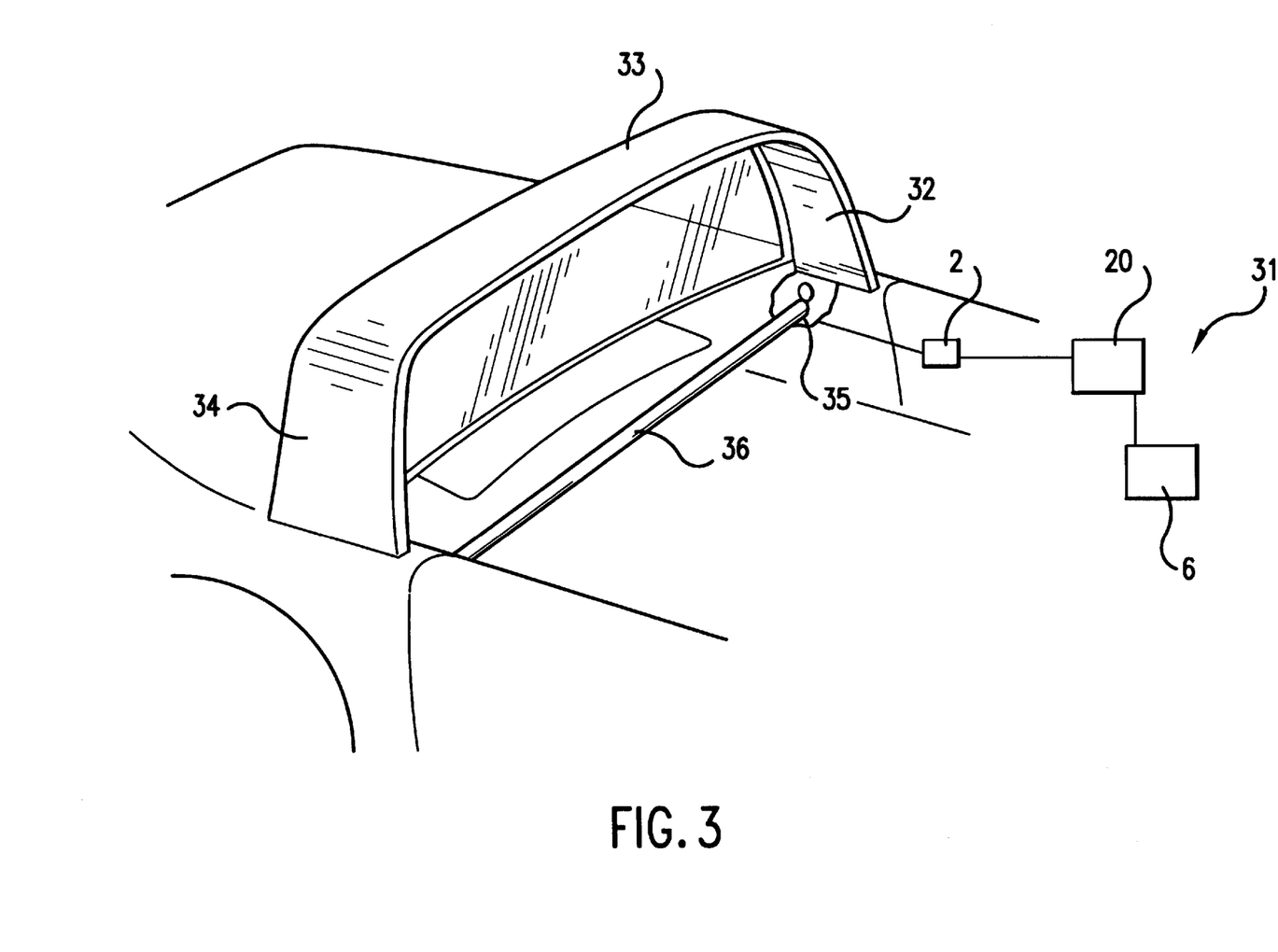
FIG. 3 is a block diagram depicting the functional interrelationships of the components of a rollover protection system and the vehicular warning system of the present invention.

Referring now to FIG. 3, a convertible vehicle 31 is shown with a rollover protection system. A roll bar 33 is pivotally mounted in the center of the vehicle. The roll bar 33 has a generally inverted U-shaped configuration with side leg portions 32 and 34 extending downward from the elongated upper or top portions thereof to a pivotal mounting assembly 35 which includes a main support bar 36.

The main support bar 36 is mounted in a suitable manner such as by a bracket or the like at each end thereof, securing the support bar 36 directly to a side wall panel in the interior of the vehicle's body. Because vehicle roll can be characterized by deviations from the horizontal plane in any direction—both linear and lateral—the rollover sensors are able to monitor an extended range of vehicle attitudes.

Referring to FIG. 3, rollover sensor 2 is coupled to mounting assembly 35. Mounting assembly 35 communicates with rollover sensor 2 to inform the sensor of the position of the vehicle. If the mounting assembly communicates to rollover sensor 2 a value that exceeds or falls below a predetermined value for describing the position of the vehicle, rollover sensor communicates this information to ECU 20. ECU 20 then determines whether to activate the rollover protection system. Once ECU 20 determines that the rollover protection system should be activated, detecting circuit 6 detects activation of the protection system and immediately forwards the information to warning controller 100. Warning controller 100 then sends a signal to warning indictor 200 which alerts other drivers of a hazardous condition. Rollover sensor 2 is also coupled to an external sensor (not shown) to determine the position of the car with respect to the ground and the speedometer (not shown) to determine the speed of the vehicle.

Data employed by rollover sensor 2 to detect an impending roll, includes the vehicle's acceleration and tilt angles as well as extension rates at the rear suspension and loss of contact between the vehicle and the road surface. Separate acceleration sensors for the longitudinal and lateral planes monitor vehicular acceleration in all directions. A microcomputer located in ECU 20 squares and sums the sensor signals before comparing the resulting acceleration data with the programmed activation threshold of roughly 5 g (where g is the acceleration of a freely falling object). A tilt switch evaluates the vehicle tilt as a second triggering criterion. The system also deploys the rollover bar 36 if vehicle inclination reaches more than 27 degrees and at least one of the two rear-axle switches has opened to generate a signal indicating rear-wheel rebound. The microcomputer and an analog hardware path furnish redundant verification of the second triggering condition in order to increase operating safety.

As well as the triggering functions, the rollover sensor 2 also carries out self-diagnosis, in which the external actuators, the rear-suspension switches, electrical system voltage and the warning lamp are diagnosed. It has a non-volatile memory, a fault clock and a serial diagnostic interface. The system responds to activation conditions by releasing the central locking system. Other lateral roll-detection systems employ tilt sensors to determine the vehicle's angular inclination (where the roll angle is greater than 52 degrees and the pitch angle is greater than or equal to 72 degrees). Another alternative is to use a gravity sensor designed to respond to the loss of road contact characteristic of incipient rollover by closing a spring-loaded Reed contact. As soon as rollover sensor 2 detects that the vehicle exceeds a predetermined vehicular angular inclination, this information is communicated to warning controller 100. Warning controller 100 then sends a signal to warning indicator 200 which activates a light or horn or other warning signal or device to alert other drivers of a hazardous condition.

A System For Detecting Obstacles With Ultrasonic Sensors:

The obstacle detector system of the invention functions to determine the distance of a vehicle from an obstacle and to warn other vehicles if a dangerous condition is detected.

Figure 4:
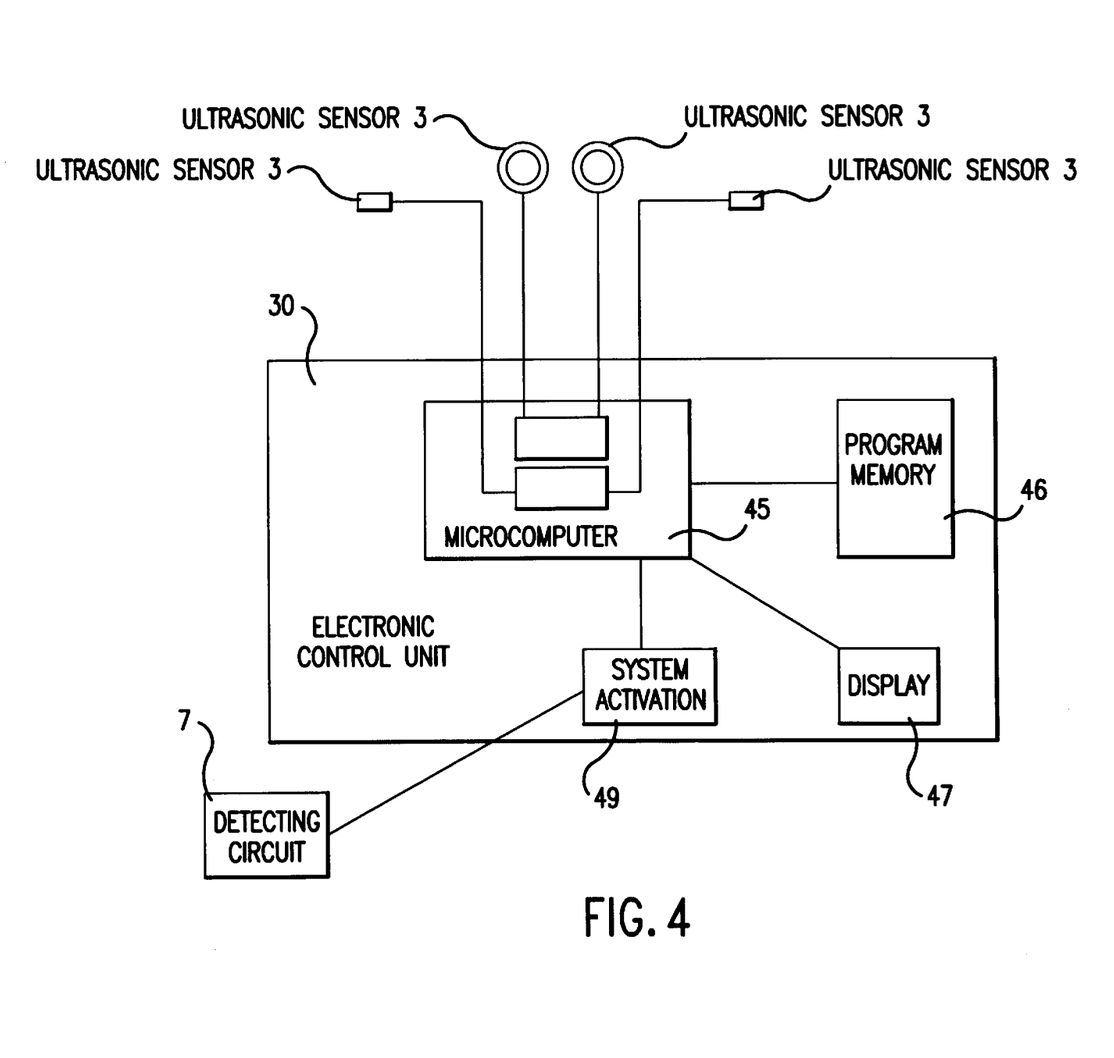
FIG. 4 is a block diagram depicting the functional interrelationships of the components of an obstacle detection system and the vehicular warning system of the present invention.

The term "obstacle" is used herein to mean a stationary or moving object within the path of the sensor, such as for example, vehicles, pedestrians, etc. The system includes at least one ultrasonic sensor and an evaluation circuit to determine the distance of the vehicle from an obstacle. Referring to FIG. 4, a block diagram of a circuit arrangement for the obstacle detector system is shown. Ultrasonic sensor 41 transmits sound waves and measures the transmitted time of an echo reflected from an obstacle. In this arrangement, the measurement of the distance from the obstacle is sufficiently precise during the approach to an obstacle as far as to a specific minimum value. The ultrasonic sensor(s) can be located under or on the front and/or rear bumpers of the vehicle. In the alternative, ultrasonic sensors can be located in any area which is useful for detecting the presence of an obstacle when the vehicle is traveling at various speeds and in various directions.

The block diagram of FIG. 4 illustrates ECU 30, which has a microprocessor 45 with a program memory 46. Contained in the program memory 46 is a control program used for measured value registration and evaluation. Also included in ECU 30 and functionally connected to microprocessor 45 is a system activation indicator 44. System activation indicator 44 may be for example, an output port which is used to determine whether the system has been activated. The microprocessor 45 is functionally connected to a display 47, on which the distance values are displayed so that the driver or passenger may detect the display. Microcomputer 45 is also connected on the input side to one or more ultrasonic sensors 3. The functions of microprocessor 45 include triggering the abovementioned components and monitoring any defects discovered in the system.

Sensors 3 are in the form of a housing such as an aluminum housing optionally having selective damping, a piezoelectric wafer as a wave generator, and the electronic circuitry necessary for the generation of ultrasonic waves and evaluation of reflected, received waves. In an alternative embodiment, sensors 3 may be already provided with the use of another system, such as for example, the ABS or the rollover protection system.

The obstacle detecting system can become activated only when the ignition is switched on, and the transmission engaged. Operation generally starts with an initial self-test in which display 41 and sensors 3 are activated and checked for correct operation. Upon completion of the self-test, the system indicates correct functioning either by means of a "ready" display or by indicating the distance to an obstacle. If a fault is detected (for instance a cable breaks), a warning tone or light or other signal is switched on for about 3 seconds. The driver is informed of the system status either optically or audibly or both, and has the option of switching off the system by means of a switch (not shown) if circumstances demand. This can be the case for instance in "stop-and-go" traffic at speeds below 15 km/h.

While driving, the sensors are triggered approximately every 50 ms, preferably every 40 ms and most preferably every 25 ms and generate an ultrasonic pulse of about 1–5 ms, preferably about 1 ms. The sensors 3 then switch to "listen" so that they can receive reflected waves. The distance to an obstacle from which the waves are reflected is calculated by processing the transmitted time taken for the waves to travel from the transmitting sensor to the receiving sensor. The shortest distance in each case from the obstacle to the bumper is optionally indicated to the driver on display 47.

The system may be programmed to detect obstacles which are a predetermined distance away from the vehicle at a given speed or the system can be automatically set to detect obstacles at a predetermined distance without driver intervention. For example the system may be programmed to detect an obstacle at 15 feet at 25 mph or 40 feet at 65 mph. Sensor(s) 3 are used to determine the position of the vehicle in respect to a detected obstacle. The sensors communicate this information to microprocessor 45 which alerts the obstacle system that an obstacle is within the predetermined or programmed range. Once microprocessor 45 determines that an obstacle is too close to the vehicle and the vehicle has not decelerated, microprocessor 45 communicates with display 47 to alert the driver of a potentially hazardous situation. Detecting circuit 7 detects that the obstacle system has been activated and forwards this information to warning controller 100. The warning controller 100 signals warning indicator 200 to warn others of a potential hazard.

System For Detecting (ABS) Antilock Braking System Deployment:

Antilock braking systems (ABS) are closed loop control devices within the braking system which prevent wheel lock up during braking and, as a result, retain the vehicle's steerability and stability. The main components of ABS are a hydraulic module, wheel-speed sensors, and a microprocessor for signal processing and control of actuators in the hydraulic modular.

Upon initial braking, brake pressure is increased; the brake slip increases and at a maximum point on an adhesion/slip curve, the brake slip reaches a limit between a stable and unstable range. From this point on, any further increase in the brake pressure or braking torque does not result in a further increase in the braking force. In the stable range, the brake slip is largely the result of a deformation slip. The brake slip increasingly tends toward skidding in the unstable range.

Figure 5:
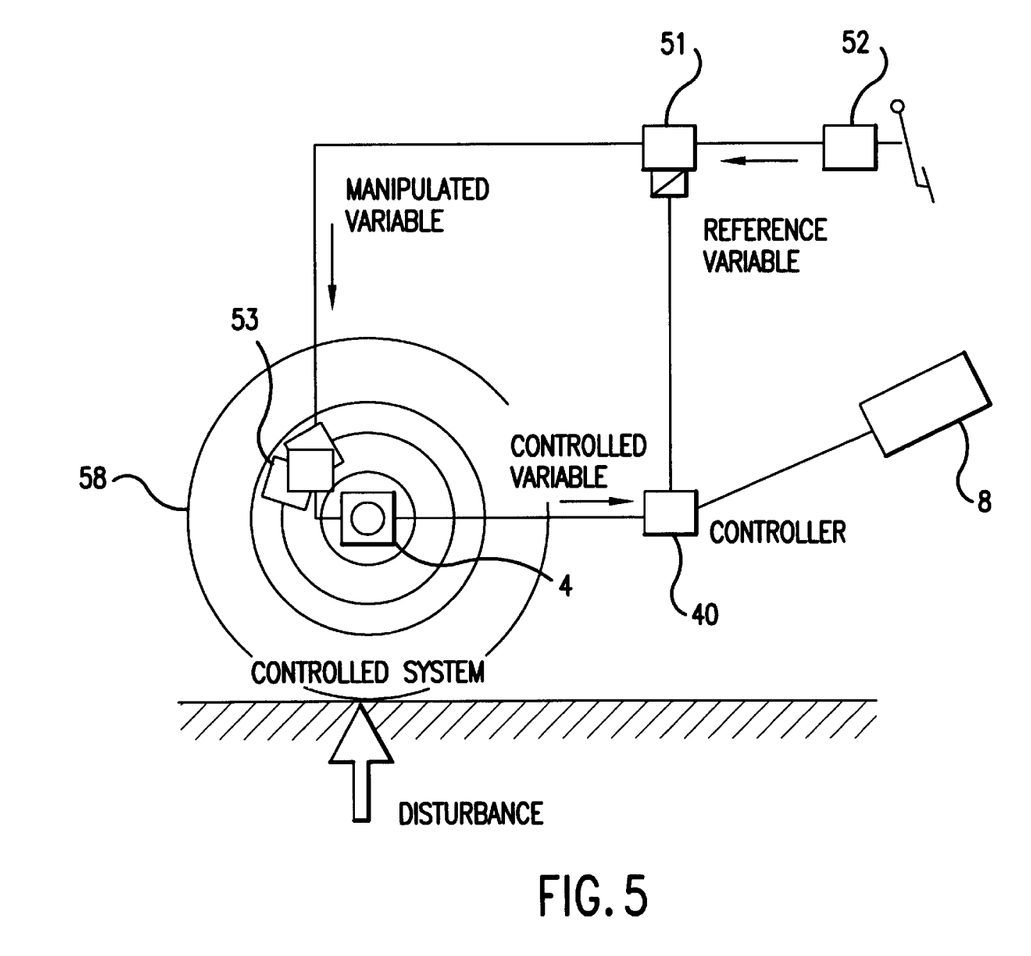
FIG. 5 is a block diagram depicting the functional interrelationships of the components of an antilock braking system (ABS) and the vehicular warning system of the present invention.

Referring now to FIG. 5, one example of an ABS control system that can be used with the present invention is shown. The ABS control system generally includes a solenoid-valve unit 51, master cylinder 52, a wheel brake cylinder 53, an electronic control unit 40 including a microprocessor 56 and a wheel speed sensor 4. Wheel-speed sensor 4 monitors the motion of the wheel 58. If one wheel shows signs of locking, there is a sharp rise in peripheral wheel deceleration and in wheel slip. If these exceed defined critical conditions, the ECU 40 sends a command to solenoid-valve unit 51 to stop or to reduce the buildup of wheel-bake pressure until the danger of lock up has passed. The brake pressure must then be built up again in order to ensure that the wheel is not under braked. During automatic brake control, it is constantly necessary for the stability or instability of the wheel motion to be detected, and the wheel must be kept in the slip range with maximum braking force by a succession of pressure-buildup, pressure-reduction and pressure-holding phases. When the ABS system is activated, ECU 40 forwards a signal to microprocessor 56 that automatic braking control is being employed. Detecting circuit 8 detects the signal sent to microprocessor 56 and alerts warning controller 100 that the ABS system has been activated. Warning controller 100 then notifies warning indicator 200 that the vehicle may be experiencing a hazardous condition. Warning indicator 200 is then activated.

Alternative Subsystems Deployable With Warning Control:

Another example of a subsystem that can be included (either alternatively or collectively) with the vehicular warning system include, for example, is a vehicle dynamic system. Vehicle dynamics is defined herein as the overall behavior of the entire system represented by "driver+ vehicle+environment". As the first link in the chain, the driver makes judgements on vehicle operating behavior based on the sum of various subjective impressions. Meanwhile, data on operating behavior, based on specific driving maneuvers executed without driver input ("open-loop operation") provide an objective description of the vehicle's operating response. Since the driver's driving behavior cannot be precisely defined, testing and/or warning systems of the present invention replace the driver input with a specific, objectively quantifiable interference factor. The resulting vehicular response is then analyzed and an appropriate response made.

Standardized versions of the driving maneuvers in the list (performed on a dry road surface) below have already either been defined or are under consideration; they serve as recognized standard procedures for vehicular evaluation:

Steady-state skidpad,

Transient response,

Braking during cornering,

Crosswind sensitivity,

Straight-running stability, and

Reaction to throttle change on skidpad.

To date, it has still not been possible to arrive at comprehensive objective definitions for the dynamic characteristics associated with closed-loop operation, as adequate data on the precise control characteristics of the human element are still unavailable.

The main criteria employed in evaluating vehicle dynamics are:

Steering-wheel angle,

Lateral acceleration,

Longitudinal acceleration and deceleration,

Yaw speed,

Float and roll angles.

Additional data are employed to verify and confirm the previously derived information on specific points of vehicle performance:

Linear and lateral velocity,

Steering angles at front and rear wheels,

Slip angles at all wheels,

Camber and pitch angles,

Steering-wheel force.

A detecting circuit can be employed to detect and monitor the operation of any of these features alone or in combination. The detecting circuit can be connected to warning controller 100 to indicate activation of one or more of the above-mentioned safety devices.

There has thus been shown and described a novel system for automatically warning others of hazardous conditions experienced by the driver of a vehicle in which the system is installed. Many changes, modifications, variations and other uses and applications of the subject invention, will however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

What is claimed is:

1. A vehicular hazard warning system comprising:
    (a) at least one sensor being triggered by an event and producing a signal;
    (b) at least one controller for receiving said signal and determining whether to activate a vehicle safety device;
    (c) at least one detecting circuit which detects activation of a vehicle safety device by said controller; and
    (d) at least one hazard warning indicator activated in response to the detected activation of said safety device.

2. The vehicular warning system according to claim 1, wherein said at least one detecting circuit is an obstacle detector detecting circuit.

3. The vehicular warning system according to claim 2, wherein said at least one warning indicator is a light or auditory signal.

4. The vehicular warning system according to claim 2, wherein said at least one warning indicator is a horn.

5. The vehicular warning system according to claim 2, wherein said at least one warning indicator is a high intensity light.

6. The vehicular warning system according to claim 1, wherein said hazard warning indicator is detectable internally.

7. A vehicle having a vehicular hazard warning system comprising:
    (a) at least one sensor being triggered by an event and producing a signal;
    (b) at least one controller for receiving said signal and determining whether to activate a vehicle safety device;
    (c) at least one detecting circuit which detects activation of a vehicle safety device by said controller; and
    (d) at least one hazard warning indicator being activated in response to the detected activation of said safety device.

8. The vehicle having a vehicular hazard warning system according to claim 7, wherein said at least one detecting circuit is an obstacle detector detecting circuit.

9. The vehicle having a vehicular hazard warning system according to claim 8, wherein said at least one warning indicator is a light or auditory signal.

10. The vehicle having a vehicular warning system according to claim 8, wherein said at least one warning indicator is a horn.

11. The vehicle having a vehicular warning system according to claim 8, wherein said at least one warning indicator is a high intensity light.

12. The vehicle having a vehicular warning system according to claim 7, wherein said hazard warning indicator is detectable internally.

13. A vehicular hazard warning system comprising:
    (a) at least one sensor detecting a hazardous condition and producing a signal;
    (b) at least one controller for receiving said signal, determining whether the hazardous condition exceeds a predetermined threshold and activating at least one safety device if hazardous condition exceeds said predetermined threshold;

(c) at least one detecting circuit which detects activation of said vehicle safety device by said at least one controller; and (d) at least one hazard warning indicator being activated in response to the detected activation of said safety device.

14. The vehicular warning system according to claim 13, wherein said at least one detecting circuit is an obstacle detector detecting circuit.

15. The vehicular warning system according to claim 14, wherein said at least one warning indicator is a light or auditory signal.

16. The vehicular warning system according to claim 14, wherein said at least one warning indicator is a horn.

17. The vehicular warning system according to claim 14, wherein said at least one warning indicator is a high intensity light.

18. The vehicular warning system according to claim 13, wherein said hazard warning indicator is detectable internally.

* * * * *